United States Defensive Publication [19] (H) [11] T988,003

Dreissen [43] Nov. 6, 1979

[54] PROCESS FOR RECOVERING LEAD FROM DISCARDED BATTERIES

[76] Inventor: Hubert H. Dreissen, St. Jansstraat 16, Geleen, Netherlands

[21] Appl. No.: 965,238

[22] Filed: Dec. 1, 1978

Related U.S. Application Data

[63] Continuation of Ser. No. 896,022, Apr. 12, 1978, abandoned.

[51] Int. Cl.[2] ..... B03B 5/34

[52] U.S. Cl. ..... 209/211; 209/172.5

[57] ABSTRACT

A process is disclosed for recovering lead from discarded storage batteries which have been crushed or ground to obtain a particulate scrap, wherein the lead is separated from non-metallic components, which are mainly plastics and suchlike from the battery casings and separators, in a hyrocyclone having a relatively large top angle of the conical part and using water as the separating medium. A scrap-water mixture is fed to the hydrocyclone and a predominantly lead-containing portion is discharged from the apex area of the hydrocyclone, while a predominantly non-metal containing portion is discharged from the overflow area of the cyclone. The water is drained from the separated portions and recycled; part of the recycled water is cleaned in a second hydrocyclone.

11 Claims, 1 Sheet Drawing,

13 Pages Specification

The file of this unexamined application may be inspected and copies thereof may be purchased (849 O.G. 1221, Apr. 9, 1968).

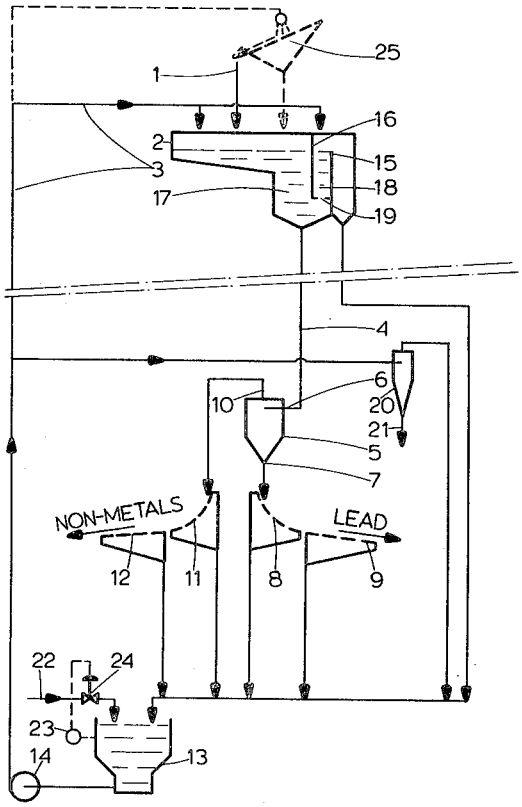

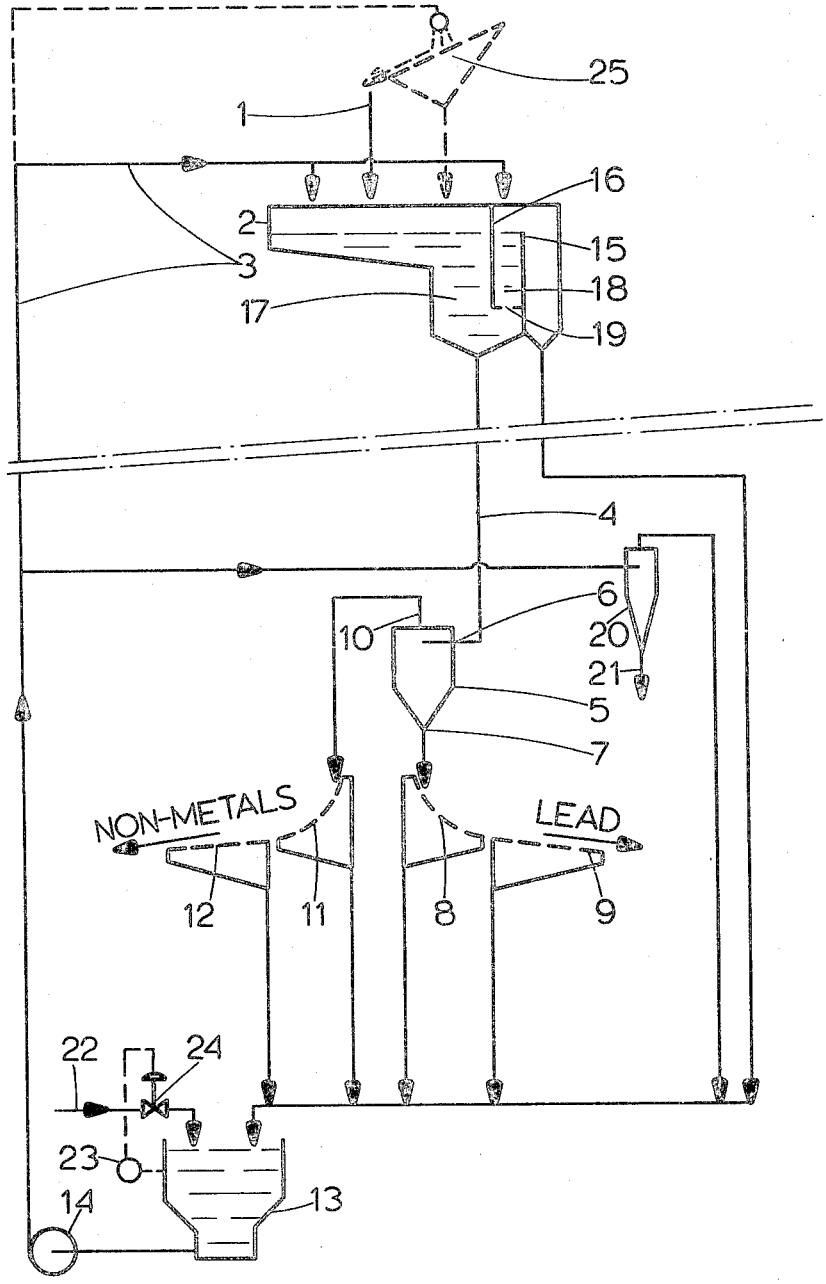
25
1
16
2
15
3
18
17
19
4
6
10
20
21
5
7
NON-METALS
LEAD
12
11
8
9
22
24
23
14
13